Patented Nov. 16, 1926.

1,606,889

UNITED STATES PATENT OFFICE.

CHESTER MOTT AND HENRY W. DAHLBERG, OF DENVER, COLORADO, ASSIGNORS, BY MESNE ASSIGNMENTS, TO PUROX COMPANY, OF DENVER, COLORADO, A CORPORATION OF COLORADO.

ABSORBENT FOR LIQUID OXYGEN EXPLOSIVES.

No Drawing. Application filed July 23, 1924. Serial No. 727,669.

In the past, absorbent materials used in connection with liquid oxygen or liquid air have consisted very largely of various forms of carbon, such as lamp black, acetylene black, et cetera.

The object of our invention is to improve both the absorbing capacity of the carbonaceous material and to give a cartridge of longer life, by the use of absorbent materials which contain large amounts of chemically combined oxygen. At the moment of explosion, when the liquid oxygen combines instantaneously with the carbon of the absorbent, this chemically combined oxygen enters into the reaction the same as the liquid oxygen. While the liquid oxygen, of course, evaporates and is lost very rapidly, the chemically combined oxygen is stable and cannot be lost, and it therefore replaces the liquid oxygen whenever there is a deficiency of the latter. As the effective life of the cartridge depends on the amount of available oxygen present at the time of explosion, this life is lengthened by the use of chemically combined oxygen.

The materials we use to furnish the chemically combined oxygen belong to the general group known as carbo-hydrates, and, particularly, the class known as polysaccharides, of the general chemical formula $(C_6H_{10}O_5)X$. Examples of polysaccharides are starch, cellulose, sphagnum moss, peat, etc. These materials need not be used in the pure form, but consist in general of carbon, hydrogen and oxygen. They contain from 40 per cent to 50 per cent of chemically combined oxygen, and, due to the fact that no purification or special treatment is necessary, they furnish a very cheap explosive material when soaked in liquid oxygen.

We have found by exhaustive experiments that when several of these materials are used together and properly dried and ground, they have an extremely high absorption capacity for liquid oxygen, give a cartridge having a life of 16 to 20 minutes, and the soaked cartridge has a greater explosive power and greater brisance than an equal weight of 40 per cent dynamite. The proportion in which these materials are used can be varied within rather wide limits, depending upon whether a very brisant, powerful explosive is desired or one with a slower heaving effect. As an example of the former type, we prefer to use an absorbent mixture consisting of approximately 32 parts dry peat or sphagnum moss, 8 parts dried molasses, and 60 parts of carbon black. A form of carbon black which has been found suitable for this purpose is known on the market as "Gas Black 'D'." This form of carbon black is produced by the burning of natural gas in the oil fields in the presence of an insufficient quantity of oxygen to permit the complete combustion of the gas. Both of the first two ingredients mentioned have a high percentage of both carbon and oxygen, while the carbon black furnishes the additional carbon required for the maximum explosive effect. All of the ingredients have the very necessary property of absorbing liquid oxygen very readily and in large amounts.

The manufacture of this absorbent is very simple. The preferred components are, for each 100 parts of absorbent:

32 parts dry peat.
8 parts dried beet or cane molasses.
60 parts gas black "D".

The wet peat should be run through a shredder or disintegrator to break up the fibrous lumps, or blocks, before drying. It can be dried in the sun, if spread out in thin layers, but for quantity production a rotary dryer installation would be more satisfactory.

The dried peat is then mixed with the molasses, which is immediately absorbed. A small amount of additional drying is then necessary in order to give a product which grinds up readily. This drying changes the molasses, absorbed in the peat, from a liquid to a viscous solid. The final step consists of grinding this product to a size of 50 to 100 mesh, and mixing it thoroughly and uniformly with the gas black "D".

The best peat for the purpose is the brown variety of a fibrous texture.

We claim as our invention:

1. An absorbent for liquid oxygen, for use as an explosive, and composed of peat, molasses mixed with the peat, the mixture being dried and finely comminuted, and finely divided carbon mixed with the aforesaid mixture.

2. An absorbent for liquid oxygen, for use as an explosive, and composed of peat, molasses mixed with the peat, the mixture being dried and finely comminuted, and finely divided carbon mixed with the aforesaid mixture, the final mixture being moulded into suitable form for use.

3. An absorbent for liquid oxygen, for use as an explosive, and composed of peat, molasses mixed with the peat, the mixture being partially dried and finely comminuted, and finely divided carbon mixed with the aforesaid mixture.

4. An absorbent for liquid oxygen, for use as an explosive, and composed of a polysaccharide, molasses mixed with the polysaccharide, the mixture being dried and finely comminuted, and finely divided carbon mixed with the aforesaid mixture.

5. An absorbent for liquid oxygen, for use as an explosive, and composed of a polysaccharide, molasses mixed with the polysaccharide, the mixture being dried and finely comminuted, and finely divided carbon mixed with the aforesaid mixture, the final mixture being moulded into suitable form for use.

6. An absorbent for liquid oxygen, for use as an explosive, and composed of a polysaccharide, molasses mixed with the polysaccharide, the mixture being partially dried and finely comminuted, and finely divided carbon mixed with the aforesaid mixture.

7. The method of producing an absorbent for liquid oxygen composed of dried peat, carbon black, and dried molasses which comprises the following steps: drying the peat, mixing the peat with the molasses in a liquid state, drying the mixed peat and molasses, comminuting said peat and molasses, and mixing said peat and molasses with said carbon black.

8. The method of producing an absorbent for liquid oxygen composed of dried peat, carbon black, and dried molasses which comprises the following steps: drying the peat, mixing the peat with the molasses in a liquid state, drying the mixed peat and molasses; comminuting said peat and molasses, mixing said peat and molasses with said carbon black, and moulding said mixture of peat, molasses and carbon black into pellets.

9. The method of producing an absorbent for liquid oxygen composed of dried peat, carbon black, and dried molasses which comprises the following steps: drying the peat, mixing the peat with the molasses in a liquid state, drying the mixed peat and molasses until said molasses loses its liquid nature and becomes a viscous solid, comminuting said peat and molasses, and mixing said peat and molasses with said carbon black.

10. The method of producing an absorbent for liquid oxygen composed of dried peat, carbon black, and dried molasses which comprises the following steps: drying the peat, mixing the peat with the molasses in a liquid state, drying the mixed peat and molasses until said molasses loses its liquid nature and becomes a viscous solid, comminuting said peat and molasses, mixing said peat and molasses with said carbon black, and moulding said mixture of peat, molasses and carbon black into pellets.

In testimony whereof, we have hereunto set our hands in the city and county of Denver, State of Colorado, this 19 day of June, 1924.

CHESTER MOTT.
HENRY W. DAHLBERG.